United States Patent
Parenti

(10) Patent No.: US 7,414,392 B2
(45) Date of Patent: Aug. 19, 2008

(54) HIGH RESOLUTION HALL EFFECT SENSOR DEVICES FOR MEASURING OPERATING PARAMETERS OF ELECTRIC MOTORS AND METHODS THEREOF

(75) Inventor: Riccardo Parenti, Pieve Ligure (IT)

(73) Assignee: Ansaldo Ricerche S.p.A., Genova (IT)

( * ) Notice: Subject to any disclaimer, the term of this patent is extended or adjusted under 35 U.S.C. 154(b) by 0 days.

(21) Appl. No.: 11/141,914

(22) Filed: Jun. 1, 2005

(65) Prior Publication Data

US 2005/0264283 A1    Dec. 1, 2005

(30) Foreign Application Priority Data

Jun. 1, 2004   (IT)   ............................ MI2004A1112

(51) Int. Cl.
    *G01B 7/30* (2006.01)
(52) U.S. Cl. .............................. 324/207.2; 324/207.25
(58) Field of Classification Search ..................
    324/207.12–207.25, 166–174; 318/652
    See application file for complete search history.

(56) References Cited

U.S. PATENT DOCUMENTS

| 3,317,829 | A | * | 5/1967 | Kuhrt et al. ................. 324/161 |
| 3,935,537 | A | * | 1/1976 | Batchelor ................... 307/652 |
| 4,086,519 | A | | 4/1978 | Persson |
| 4,142,152 | A | * | 2/1979 | Fincher ....................... 324/165 |
| 4,733,117 | A | * | 3/1988 | Perrins ........................ 310/162 |
| 5,313,159 | A | * | 5/1994 | Allwine, Jr. ............... 324/207.2 |
| 5,543,672 | A | * | 8/1996 | Nishitani et al. ............... 310/77 |
| 5,712,561 | A | | 1/1998 | McCurley et al. |
| 5,982,169 | A | | 11/1999 | Furlani et al. |
| 5,998,989 | A | * | 12/1999 | Lohberg ..................... 324/174 |
| 6,118,271 | A | | 9/2000 | Ely et al. |
| 6,154,025 | A | * | 11/2000 | Schelter et al. ......... 324/207.21 |
| 6,363,795 | B1 | * | 4/2002 | Bergqvist et al. ......... 73/861.77 |
| 6,882,142 | B2 | * | 4/2005 | Koike et al. .................. 324/174 |
| 7,009,384 | B2 | * | 3/2006 | Heremans et al. ........... 324/165 |
| 7,116,100 | B1 | * | 10/2006 | Mock et al. ............. 324/207.25 |
| 2002/0021124 | A1 | | 2/2002 | Schott et al. |
| 2003/0117132 | A1 | * | 6/2003 | Klinghult ............... 324/207.25 |

* cited by examiner

*Primary Examiner*—Jay M Patidar
(74) *Attorney, Agent, or Firm*—Nixon Peabody LLP

(57) ABSTRACT

A device for measuring operating parameters of an electric motor includes a non-ferromagnetic disk which is solidly connected to a rotor of the electric motor and is provided with a plurality of peripheral sockets. A plurality of magnets are associated with the sockets. A pair of Hall effect sensors face the non-ferromagnetic disk on the surface of which the sockets are set. An acquisition and processing system of the signals produced by the Hall effect sensors comprises a resolver to digital converter module adapted to multiply said signals by the cosine and the sine of an arbitrary angle, to subtract the results one from the other and to process the resulting signal through a negative feedback system. The Hall effect sensors are placed so their resulting output signals are in electrical quadrature between each other.

19 Claims, 1 Drawing Sheet

US 7,414,392 B2

HIGH RESOLUTION HALL EFFECT SENSOR DEVICES FOR MEASURING OPERATING PARAMETERS OF ELECTRIC MOTORS AND METHODS THEREOF

FIELD OF THE INVENTION

This invention refers to the field of position and movement sensors.

STATE OF THE ART

The use of Hall effect sensors for the detection of the spectrum and intensity of magnetic fields is known in the art.

The operation of these sensors is based on the measurement of the interference that the incident magnetic field causes to the electrical current within the sensor and requires their positioning so as to be affected only by the magnetic field source that needs to be measured. When such magnetic field, generated for example inside an electric motor, has a shape which allows an indirect measurement—via magneto-sensitive sensors—of operational variables such as, for example, the position or speed of rotation of a mechanical shaft, there may be a problem concerning the effective use of said sensors, which is very difficult especially when said sensors are inside the electric motor.

As a matter of fact, if on the one hand the high degree of measurement accuracy given by the Hall effect sensors offers the possibility to effectively determine the operational variables of the electric motor, on the other hand the high level of electromagnetic noise produced inside the electric motor normally makes it unfeasible to achieve an appropriate positioning of the Hall sensor so as to be sufficiently immune to the magnetic fields which are not relevant to the measurement.

From what has been described, it is evident that it would be desirable to achieve a measuring device and a measurement method based on Hall effect sensors able to overcome the above drawbacks and make it possible to take advantage of the accuracy and versatility of said sensors in specific areas such as, for example, the determination of operational variables of electric motors.

SUMMARY OF THE INVENTION

This invention describes a position sensor with a high resolution Hall effect and high immunity against electromagnetic noise to be used for controlling electric motors and mechanical shafts. Said sensor comprises the mapping means of a magnetic field related to operational variables internal to an electric motor; detection devices of said magnetic field; acquisition and processing means of the signals produced by said magnetic field detection devices. A particular aim of the present invention is to disclose a device and a method for measuring operational variables of electric motors with the use of a position sensor employing a high resolution and high electromagnetic interference immunity Hall effect sensor, as described more fully in the claims below, which are an integral part of the present description.

DETAILED DESCRIPTION OF THE INVENTION

The device, according to the present invention, comprises a position sensor with a high resolution and high electromagnetic interference immunity Hall effect sensor to be used for controlling electric motors and mechanical shafts. Generally, said device comprises: mapping means of magnetic fields related to operational variables of an electric motor; detection means of said magnetic field; acquisition and processing means of the signals produced by said magnetic field detection means.

Figure 1:
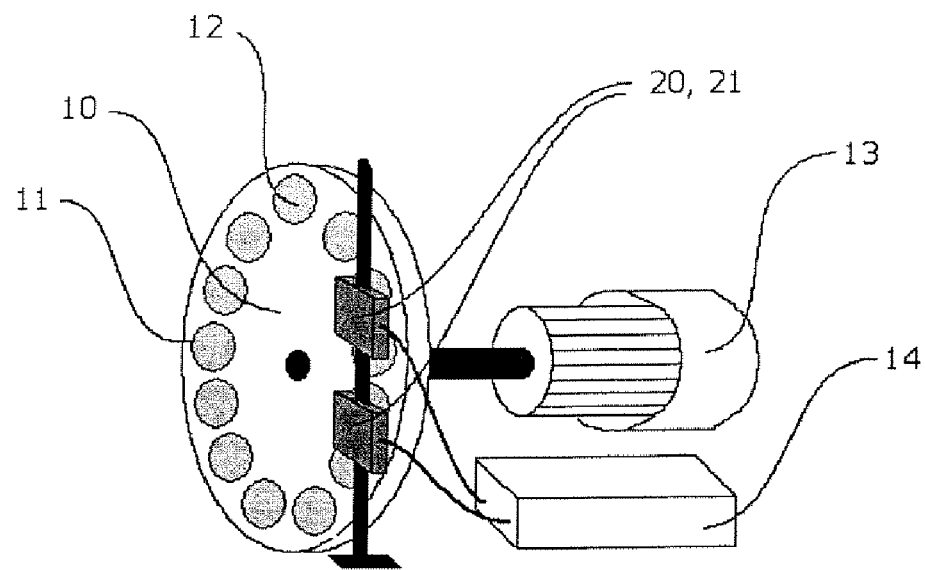
FIG. 1: Overall view of a particular embodiment of the device according to the present invention.

With reference to FIG. 1, we can see a possible embodiment of the device according to the present invention. Said embodiment includes the following parts:

A device for mapping magnetic fields related to operational variables of an electric motor, realised, for example, by a disk made of non-ferromagnetic material, for example aluminium 10, provided with a certain number of circular sockets 11 on the outer boundary, related to the number of poles of the motor 13, the shaft angular position of which is to be measured. Said number can be chosen, for example, equal to the number of the poles of the motor 13 or equal to a multiple or a sub-multiple of said number.

In a preferred embodiment of the device according to the present invention, the said non-ferromagnetic disk shall have a diameter between 200 mm and 500 mm, in particular, a preferred embodiment of the present invention will be described in which said diameter is equal to 220 mm A set of magnets 12, for example circular-shaped, which fit into said sockets. In a preferred embodiment of the present invention, sixteen Nd—Fe—B circular-shaped magnets, type SC35MA80° C., having a diameter of 30 mm, a thickness of 2 mm will be used and will be placed with their geometric centers located around a circumference of 183 mm in diameter.

Two linear Hall effect sensors 20, 21, for example of the differential type, placed in mutual electrical quadrature and facing said aluminium disk on which the magnets 12 are placed.

An interface and acquisition card 14 which comprises means for extracting information regarding the absolute electrical angular position from the output signals of the Hall effect sensors.

Figure 2:
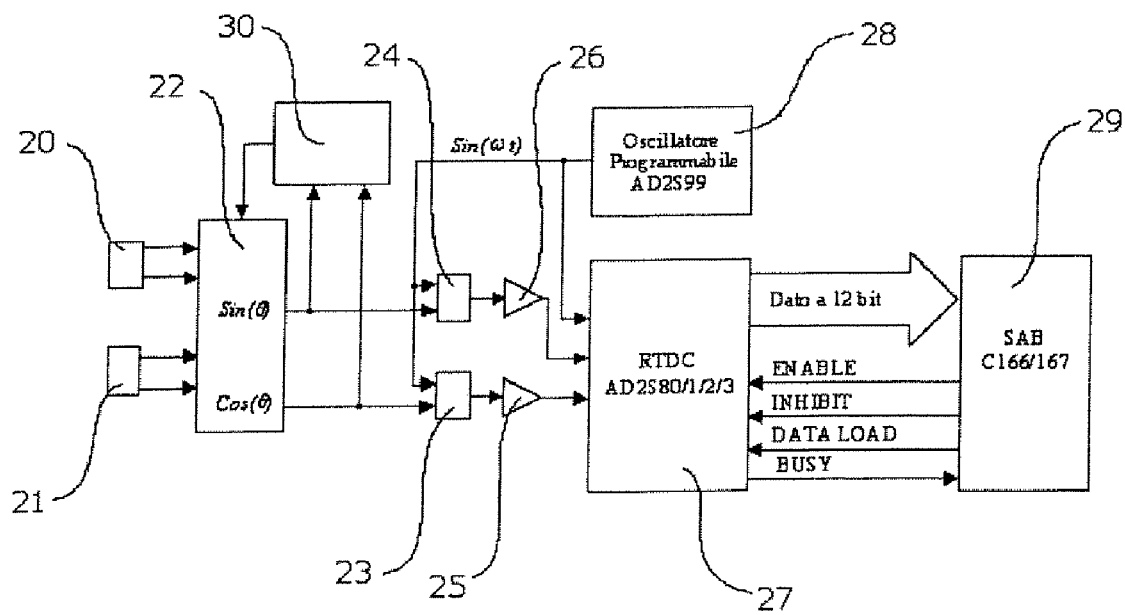
FIG. 2: Block diagram of the device according to the present invention.

According to a preferred embodiment of the present invention, said means for extracting information regarding the absolute electrical angular position from the output signals of the Hall effect sensors are shown in the block diagram in FIG. 2, which include the following:

Hall effect sensors 20, 21;

an analog signals processing card 22 used for: reconstructing the magnetic field value from the differential output signals of sensors 20 and 21, making sure that any electrical offsets are totally removed and ensuring an appropriate amplification of the detected signal;

two analog multipliers 23, 24, if required;

two signal amplifiers 25, 26;

a programmable oscillator 28;

an RTDC (Resolver To Digital Converter) module 27, if required, namely a functional unit which is normally made with commercial components according to the methods described in the prior art and able to achieve angular information when connected to a conventional "resolver" device;

a microprocessor acquisition card 29, if required.

The device may be completed with a self-calibration circuitry 30, if required, which is able, for instance, to allow proper operation even in case of parameter variations of the electronic and magnetic components caused by the ageing or altered environmental conditions in which the device operates.

The non-ferromagnetic disk 10 is solidly connected with the electric motor shaft, the motion of which is to be analyzed in addition to the determination of the exact angular position of the rotor. Depending on the type of motor being tested, it is possible to choose an appropriate setup of the device according to the present invention in order to allow the specific arrangement of the magnets 12 in the recesses 11 to exactly reproduce the magnetic field spectrum in order to measure the operational variables of the motor involved. As a result of such configuration, it is possible to read, at the terminals of the Hall effect sensors, for example two pairs of analog differential signals which, when appropriately processed, will result in pseudo-sinusoidal signals in quadrature between each other with the same frequency of the values of the supply current of the motor under test and from which it will be possible to extract, for example, the instantaneous electrical angular position of the rotor with a process based on the properties of elementary trigonometric functions.

The above-mentioned magnetic field mapping and detection means can be implemented within the same electric motor of which the operation parameters are being measured, without showing the problems mentioned above, and associated with the presence of a high level of electromagnetic noise generated inside the electric motor during its normal operation.

Specifically, the method for the determination of the angular position of the motor, according to the present invention, is carried out according to the following steps:

a) The Hall effect sensors 20, 21 detect the magnetic field of the magnets 12 placed on the outer boundary of the aluminium disk 10, thereby generating two differential electrical signals;

b) The signals obtained at step a) are processed by the processing card 22 in order to shape them into sinusoidal signals in quadrature between each other c) The signals obtained at step b) will eventually be modulated in amplitude via a sinusoidal signal generated from the programmable oscillator 28 with a suitable frequency (for example, twenty times higher, although it is also possible to employ a "zero frequency" modulating signal: in this case the output signal from the multiplier will have the same shape of the original input signal and an amplitude scaled up or down by a multiplicative constant) relative to the maximum electric frequency of the motor supply current, said maximum frequency being equal to the frequency of rotation multiplied by the number of poles of the electric machine.

d) The signals obtained at step c) are processed by a "Resolver To Digital Converter" (RTDC) circuitry 27 in order to extract the data related to the angular position of the motor, thereby making it available for subsequent processings, if any.

The following specifies more in detail the processings carried out by the method previously described.

Assuming $\theta$ is the instantaneous electrical angular position of the rotor to be determined; and assuming A is the amplitude and $\omega$ the angular frequency of the sinusoidal carrier used in step c). The modulated signals generated at step c) and sent to the "Resolver To Digital Converter" (RTDC) will be as follows:

$$IN1 = A \cdot \sin \omega t \cdot \sin \theta$$

$$IN2 = A \cdot \sin \omega t \cdot \cos \theta$$

The RTDC board, already known in the prior art, is generally designed as to transform this information directly into the value of $\theta$ which represents the measurement of the required angle, output through a negative feedback system. Let's assume that the RTDC system starts from any arbitrary angle $\theta$ value, assuming it is $\phi$, generically represented in digital form by a digital counter within the RTDC board;

In step d), within the RTDC board, the two signals mentioned above are respectively multiplied by the cosine and by the sine of the angle $\phi$, thereby obtaining the following signals:

$$x1 = A \cdot \sin \omega t \cdot \sin \theta \cdot \cos \phi$$

$$x2 = A \cdot \sin \omega t \cdot \cos \theta \cdot \sin \phi$$

At the output of the multiplier of the RTDC board, an error amplifier subtracts signal x2 from signal x1, thus obtaining:

$$\epsilon = x1 - x2 = A \cdot \sin \omega t \cdot (\sin \theta \cdot \cos \phi - \cos \theta \cdot \sin \phi)$$

or:

$$\epsilon = A \cdot \sin \omega t \cdot \sin(\theta - \phi)$$

Lastly, a negative feedback system inside the RTDC board, based on a Phase Locked Loop (PLL), quickly adjusts the value $\phi$ of the counter so as to eliminate the angular error $(\theta - \phi)$.

Therefore, the signal obtained in step d) of the method according to the present invention contains the information related to the absolute electrical angular position which is stored into the N bit counter of the RTDC board and can be output using several communication protocols, such as, for example, serial, parallel, incremental encoder emulation protocols etc.

The invention claimed is:

1. A device for measuring operating parameters of an electric motor comprising:
    at least a non-ferromagnetic disk solidly connected to a rotor of the electric motor and provided with a plurality of peripheral sockets;
    a plurality of magnets associated with the sockets;
    at least a pair of Hall effect sensor facing the non-ferromagnetic disk on the surface of which the sockets are set;
    an acquisition and processing system of the signals produced by the Hall effect sensors comprising a resolver to digital converter module adapted to multiply the signals by the cosine and the sine of an arbitrary angle, to subtract the results one from the other and to process the resulting signal through a negative feedback system, the Hall effect sensors are placed so their resulting output signals are in electrical quadrature between each other.

2. The device according to claim 1 wherein the acquisition and processing system comprises a resolver to digital converter module.

3. The device according to claim 2 wherein the acquisition and processing system further comprises:
    an analog signal processing device adapted to reconstruct a motor magnetic field value from the output signals of the Hall effect sensors; and
    at least one signal amplifier coupled to the analog signal processing device and to the resolver to digital converter module.

4. The device according to claim 3 further comprising a self-calibration circuitry coupled to the analog signal processing device.

5. The device according to claim 4 wherein the acquisition and processing system further comprises a microprocessor acquisition device.

6. The device according to claim 5 wherein the acquisition and processing system further comprises:
at least one analog multiplier coupled to the analog signal processing device and to the at least one signal amplifier; and
at least one programmable oscillator coupled to the at least one signal amplifier and to the resolver to digital converter module.

7. The device according to claim 6 wherein a number of the sockets is related to a number of poles of the electric motor.

8. The device according to claim 7 wherein the number of the sockets is equal to the number of the poles of the electric motor.

9. The device according to claim 7 wherein the number of the sockets is one of a multiple and a sub-multiple of the number of the poles of the electric motor.

10. The device according to claim 9 wherein the Hall effect sensors are of a differential type.

11. The device according to claim 10 wherein the non-ferromagnetic disk provided with a plurality of peripheral sockets, the plurality of magnets associated with the sockets and the pair of Hall effect sensor facing the non-ferromagnetic disk on the surface of which the sockets are set are located within the electric motor.

12. The device according to claim 11 wherein the non-ferromagnetic disk has a diameter between 200 and 500 mm.

13. The device according to claim 12 wherein the non-ferromagnetic disk is made of aluminum.

14. The device according to claim 13 wherein the magnets are of a Nd—Fe—B type.

15. The device according to claim 13 wherein the sockets and the magnets have circular shape.

16. The device according to claim 15 wherein the magnets have a diameter between 30 and 90 mm and a thickness between 1.5 and 10 mm.

17. A method for measuring operating parameters of an electric motor, the method comprising:
detecting a magnetic field generated by magnets placed on an outer boundary of an aluminum disk via Hall effect sensors to generate two differential electrical signals;
processing the generated differential signals to shape them as sinusoidal signals in quadrature between each other; and
extracting data related to an angular position of the electric motor from the processed signals via a multiplication of said signals by the cosine and the sine of an arbitrary angle, a subtraction of the results one from the other and the processing of the resulting signal through a negative feedback system.

18. The method according to claim 17 further comprising modulating in amplitude the processed signals via a sinusoidal signal with an appropriate frequency with respect to a maximum electrical frequency of the motor supply current, the maximum frequency being equal to a frequency of rotation multiplied by a number of poles of the electric motor, wherein the extracting further comprises extracting data related to an angular position of the electric motor from the modulated signals.

19. A method for measuring operating parameters of an electric motor, the method comprising:
detecting a magnetic field generated by magnets placed on an outer boundary of an aluminum disk via Hall effect sensors to generate two differential electrical signals;
processing the generated differential signals to shape them as sinusoidal signals in quadrature between each other;
modulating in amplitude the processed signals via a sinusoidal signal with an appropriate frequency with respect to a maximum electrical frequency of the motor supply current, the maximum frequency being equal to a frequency of rotation multiplied by a number of poles of the electric motor; and
extracting data related to an angular position of the electric motor from the modulated signals.

* * * * *